United States Patent [19]
DeWitte et al.

[11] 3,787,735
[45] Jan. 22, 1974

[54] LOGIC DETECTOR APPARATUS

[75] Inventors: Maurice J. DeWitte, Elmhurst;
Gerald L. Wojciechowski, Chicago, both of Ill.

[73] Assignee: GTE Automatic Electric Laboratories Incorporated, Northlake, Ill.

[22] Filed: Mar. 27, 1973

[21] Appl. No.: 345,425

[52] U.S. Cl............. 307/203, 307/215, 307/235 R, 324/73 R, 324/133
[51] Int. Cl...................... H03k 19/34, H03k 19/00
[58] Field of Search... 307/203, 215, 235; 324/72.5, 324/73 R, 133; 340/214, 248, 248 A, 248 B, 248 C

[56] References Cited
UNITED STATES PATENTS
3,528,006  9/1970  Davis, Jr. et al.................. 324/73 R
3,742,351  6/1973  Palmer et al...................... 324/72.5

*Primary Examiner*—John Zazworsky
*Attorney, Agent, or Firm*—R. F. Van Epps

[57] ABSTRACT

Logic detector apparatus for detecting positive and negative voltage levels with respect to "one" and "zero" reference levels in either positive or negative logic modes the apparatus including a NOR gate output stage coupled to the outputs of four selection NOR gates, respective selection NOR gates being associated respectively with detecting positive and negative voltage levels with respect to the reference levels in positive and negative logic modes, and a comparator for detecting positive and negative voltage levels, the output of the comparator being coupled to the selection NOR gates, whereby respective selected NOR gates control the output of the output NOR gate to provide respective outputs responsive to whether the logic signal detected is more or less positive than the respective "zero" or "one" reference level in either logic mode.

9 Claims, 1 Drawing Figure

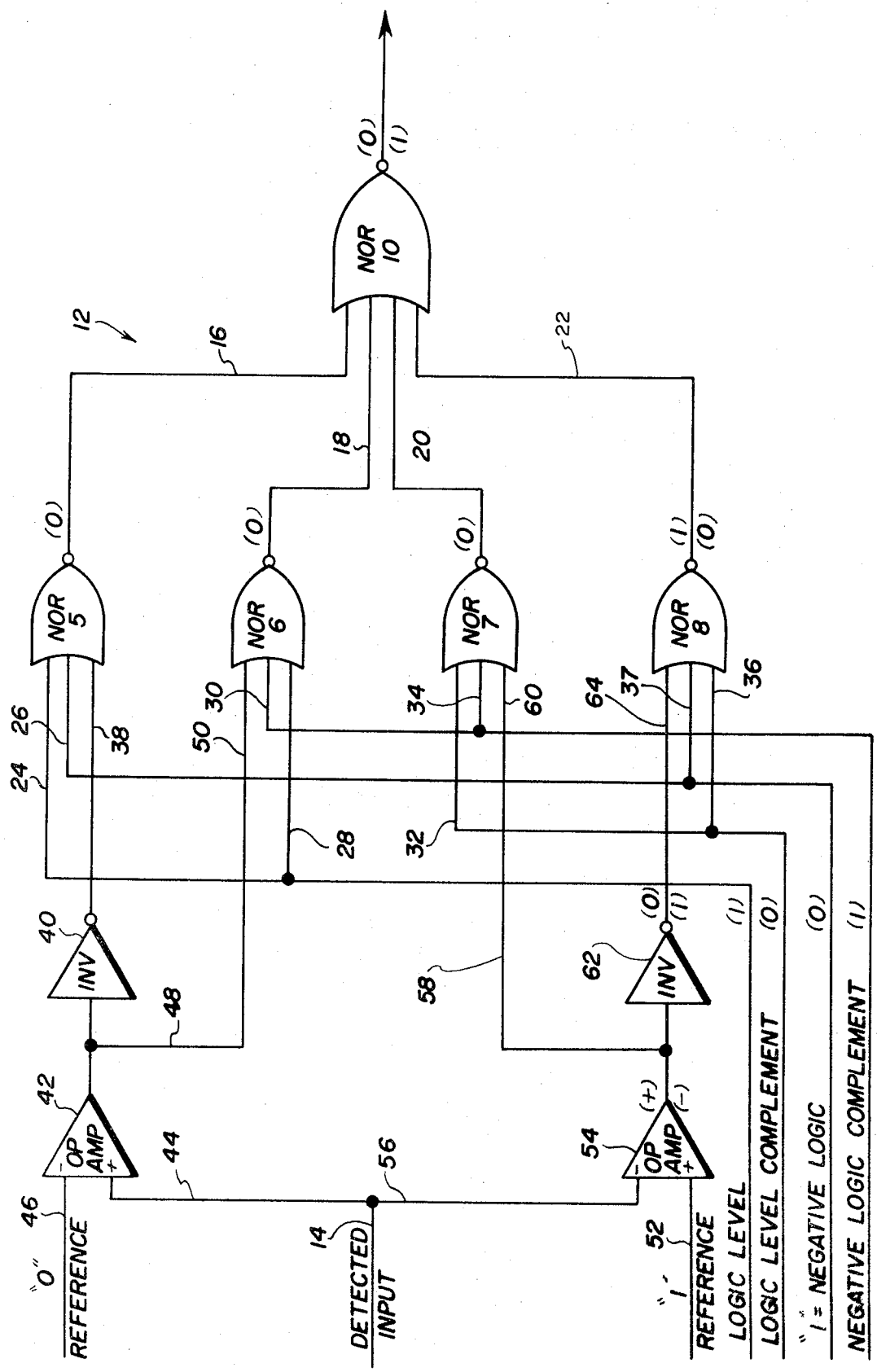

LOGIC DETECTOR APPARATUS

This invention relates to logic detector apparatus and in particular to apparatus for detecting positive and negative voltage levels in a test signal varying from reference logic levels.

The following U.S. Pats. and publications may be referred to: 3,683,284; 3,659,209; 3,631,352; 3,585,507; 3,538,443; 3,492,589; 3,491,302; and IBM TECHNICAL BULLETIN Vol. 9 No. 1, June 1966 Pages 58-61.

One of the many uses of logic detectors is in the testing of components and assembled components, as for instance, printed circuit card assemblies. Automatic testing systems have been utilized for checking various logic apparatus by coupling a reference voltage level to the apparatus under test and using logic detectors to determine whether the output test signal from the apparatus is greater than or less than the reference voltage. As an example, in a normal positive logic system (with a "one" logic level more positive than a "zero" level), prior art logic detectors are capable of determining whether there is any fault in the apparatus under test.

However, if the apparatus under test operates with negative logic (where the "zero" logic level is more positive than the "one" level), the prior art logic detector utilized for the positive logic situation cannot be used. This either requires additional logic detector apparatus or significant remodifications of the existing detector in order to provide the desired testing of negative logic apparatus. Because of the widespread use of logic circuits of each type, it is desired to provide a single logic detector capable of use with positive or negative logic systems.

SUMMARY OF THE INVENTION

Logic detector apparatus is provided which can detect both positive and negative voltage levels for both the "one" levels and the "zero" levels. Control inputs are provided with the logic detector apparatus of the present invention for detecting a "one" level which is either more positive or more negative than a "zero" level.

The apparatus includes a NOR gate output stage having four inputs coupled from respective NOR gates. For either testing apparatus in a positive logic or negative logic system a check can be made for both the "one" and the "zero" reference levels. Thus, in each testing sequence, there is a particular associated one of the four NOR gates which controls the output of the output NOR gate for both more positive or less positive checking of the particular reference level. Switching from testing a positive logic system to a negative logic system only requires the appropriate switching of control inputs to the detector apparatus.

DETAILED DESCRIPTION

Referring now to the drawing, there is illustrated the preferred embodiment of a logic detector apparatus 12 in accordance with the present invention. In particular, there is provided input line 14 for receiving a signal corresponding to a logic level. The following description coincides with the use of the illustrated logic detector in a testing system for checking failures in an apparatus under test, the line 14 being coupled to the output of the apparatus.

The illustrated NOR gate 10 at the output stage of the illustrated detector provides either one of two output levels depending upon the status of the detected input signal on input line 14 to the detector. NOR gate 10 includes four input leads 16, 18, 20 and 22 which are respectively coupled to the output of NOR gates 5, 6, 7 and 8. Each of the NOR gates 5 through 8 contains three input lines, two of which are associated with control inputs for enabling the logic detector apparatus 12 to be used for detecting both "one" levels and "zero" levels in either a positive or negative logic environment.

As an example, NOR gate 5 has input lines 24 and 26 which are coupled to the respective control input lines labeled Logic Level and Negative Logic. Similarly, NOR gate 6 has two of its input leads 28 and 30 coupled respectively to the Logic Level and Negative Logic Complement control input lines. NOR gate 7 has two of its input leads 32, 34 coupled respectively to Logic Level Complement and Negative Logic Complement control input lines. NOR gate 8 has two of its input leads 36, 37 coupled respectively to the Logic Level Complement and the Negative Logic control input lines.

In addition to the two control input leads to each of the NOR gates 5-8, there is also provided as an input to each of these gates a detected logic signal. For instance, the input lead 38 to NOR gate 5 is coupled to inverter 40 which in turn is coupled to operational amplifier 42. Operational amplifier 42 includes two inputs—one input line 44 being coupled to the positive input and a "zero" reference being coupled to the negative input through line 46 at the input of the operational amplifier 42. A non-inverted output of operational amplifier 42 is coupled through line 48 to the remaining input 50 of NOR gate 6.

A similar configuration is provided for the NOR gates 7 and 8, wherein a "one" reference level is coupled through input line 52 to the positive input of operational amplifier 54 and the detected input on line 14 is coupled through line 56 to the negative input of operational amplifier 54. A non-inverted output of the operational amplifier 54 is coupled through line 58 to the remaining input feed 60 of NOR gate 7. The inverted output of operational amplifier 54 provided by inverter 62 is coupled to the remaining input lead 64 of NOR gate 8.

In operating the logic detector apparatus 12 in detecting both positive and negative voltages for "one" levels and "zero" levels in either a positive logic or a negative logic situation, the control inputs-Logic Level, Logic Level Complement, Negative Logic, and Negative Logic Complement, are initially set to correspond to the situation desired. For purposes of illustrating the operation of the preferred embodiment of the present invention, it is first assumed that a positive logic system, i.e., with a "one" level more positive than a "zero" level is being checked. For assistance in following the description herein, there has been indicated on the drawing in parentheses the status of the various control inputs for this example. In addition, there has also been illustrated on the drawing in parantheses the various states.

As can be seen from the drawing, the Negative Logic control input is at a "zero" level and the Negative Logic Complement is at a "one" level. These two control leads remain in this state during all testing in a positive logic environment.

If we assume initially that we are detecting a "one" level, the Logic Level control input is set to a "one" whereas the Logic Level Complement control lead is set to a "zero." In this state of the control inputs, the outputs of NOR gates 5, 6 and 7 are all held at a "zero" state. Thus, three of the four inputs to the output stage NOR gate 10 are all held at a "zero" level, providing control of this output gate to the output of NOR gate 8. Since two of the inputs to NOR gate 8 from the control inputs are both "zero" the output of NOR gate 8 is dependent, through inverter 62 to the output of operational amplifier 54.

If we assume that the detected input signal at input line 14 to the logic detector apparatus 12 is less positive than the "one" reference applied to line 52, operational amplifier 54 will swing to its positive limit. This provides a "zero" at the input line 64 from inverter 62 and a corresponding "one" at the output of NOR gate 8. The "one" on line 22 and the "zeros" on the remaining input lines 16, 18 and 20 of NOR gate 10 provide a "zero" output of NOR gate 10 which indicates a failure in the apparatus under test.

If the detected input at line 14 is more positive than the "one" reference at line 52, operational amplifier 54 will swing to its negative extreme providing a "one" output from inverter 62. This is indicated for convenience on the drawing by the "one" in parantheses below the previous "zero" at the output of inverter 62. In this condition, NOR gate 8 switches to a "zero" output which places a "one" at the output of NOR gate 10. This is also illustrated on the drawing by the states indicated in parantheses below the prior states at the outputs of NOR gates 8 and 10, respectively.

For testing a "zero" level in a positive logic set-up, a "zero" is applied to the Logic Level control input and a "one" is applied to the Logic Level Complement control input. The operation is similar to that previously described in connection with the "one" level detection, except that the NOR gate 5 controls the operation of NOR gate 10. Note here that the "zero" reference is applied to the negative input of operational amplifier 42, thus inverting the swing of the output of this amplifier. In the case where a negative logic system is to be checked, i.e., where the "zero" level is more positive than the "one" level, the Negative Logic control input is switched to a "one" and the Negative Logic Complement control input is placed at a "zero." In this case, if a "one" level is to be checked, the Logic Level lead is a "one" and a "zero" is applied to its Complement control input. This places both input lines 32, and 34 of NOR gate 7 at "zero" so that this gate will now control the output of NOR gate 10. If the detected input on line 14 is more positive than the "one" reference, operational amplifier 54 will swing to its negative extreme. This forces a "zero" on the input 60 which swings the output of NOR gate 7 to a "one" and forces the output of NOR gate 10 to a "zero."

For testing a logic "zero" in a negative logic system, a "zero" is applied to the Logic Level control input and a "one" is applied to its Complementary control input. This places NOR gate 6 in control of the output of NOR gate 10.

It is understood that a final NAND gate and four selection NAND gates may be substituted for the corresponding NOR gates illustrated and the logic detector still operated in accordance with the principles of this invention. Such a substitution would require inverting the logic and negative logic control inputs in order to obtain the same output levels as previously described with respect to the NOR gates. In the alternative, only the logic level control inputs need be inverted, however, the corresponding output levels will be inverted from that previously described.

Reference may be made to the following table which sets forth the conditions of the control inputs for both the positive and negative logic situations for detecting either the "one" or the "zero" level in each system, and the resulting output of NOR gate 10 if the detected input is either more positive or less positive than the "one" and "zero" reference levels.

For "1" More Positive Than "0"

| | | | |
|---|---|---|---|
| Negative Logic | 0 | | |
| Negative Logic Comp. | 1 | | |
| (1) Detecting "1" Level: | | (2) Detecting "0" Level: | |
| Logic Level | 1 | Logic Level | 0 |
| Logic Level Comp. | 0 | Logic Level Comp. | 1 |
| NOR 10 Output: | | NOR 10 Output: | |
| If Det. Input Less Positive Than "1" Reference | 0 | If Det. Input Less Positive Than "0" Reference | 1 |
| If Det. Input More Positive Than "1" Reference | 1 | If Det. Input More Positive Than "0" Reference | 0 |

For "0" More Positive Than "1"

| | | | |
|---|---|---|---|
| Negative Logic | 1 | | |
| Negative Logic Comp. | 0 | | |
| (3) Detecting "1" Level: | | (4) Detecting "0" Level: | |
| Logic Level | 1 | Logic Level | 0 |
| Logic Level Comp. | 0 | Logic Level Comp. | 1 |
| NOR 10 Output: | | NOR 10 Output: | |
| If Det. Input More Positive Than "1" Reference | 0 | If Det. Input More Positive Than "0" Reference | 1 |
| If Det. Input Less Positive Than "1" Reference | 1 | If Det. Input Less Positive Than "0" Reference | 0 |

The foregoing detailed description has been given for clearness of understanding only, and no unnecessary limitations should be understood therefrom, as modifications will be obvious to those skilled in the art.

What is claimed is:

1. Logic detector apparatus for receiving a logic input signal and selectively detecting positive and negative voltage levels in said input signal with respect to "one" and "zero" reference levels in positive or negative logic modes, said logic detector apparatus comprising:

a final NOR gate having four input leads and an output;

four selection NOR gates each having an output connected to a respective input of said final NOR gate;

two logic mode control inputs to said apparatus for selecting two of said selection NOR gates for respective operation in one of said positive or negative logic modes;

two reference level control inputs to said apparatus for selecting two of said selection NOR gates for respective operation in detecting positive and negative voltage levels in said input signal with respect to one of said reference levels;

means for coupling said logic mode control inputs and said reference level control inputs to the inputs of each of said selection NOR gates for selecting one of said selection NOR gates associated with one of said logic modes and one of said reference levels;

comparator means for receiving said logic input signal;

said comparator means including means for comparing said input signal with one of said reference levels and coupling respective outputs to two of said selection NOR gates and means for comparing said input signal with the other of said reference levels and coupling respective outputs to the other two of said selection NOR gates, and said output NOR gate providing an output responsive to said input signal being more or less positive than the respective reference level.

2. Logic Detector apparatus according to claim 1, wherein said comparator means includes respective operational amplifiers for comparing said input signal with each of said "zero" and "one" reference levels.

3. Logic detector apparatus according to claim 2, wherein said comparator means further includes inverter means for inverting the respective outputs of said operational amplifiers.

4. Logic detector apparatus according to claim 3, wherein said inverter means comprises respective inverter stages coupled intermediate the outputs of said operational amplifiers and the inputs of said selection NOR gates so that a first two of said selection NOR gates receive inputs representing an inverted output of a respective operational amplifier.

5. Logic detector apparatus according to claim 4, wherein said comparator means includes means for respectively coupling the outputs of said operational amplifiers to the respective inputs of a second two of said selection NOR gates to that said second two selection NOR gates receive inputs representing the output of said respective operational amplifiers.

6. Logic detector apparatus according to claim 5, including means for coupling said "zero" reference level to the negative input of one of said operational amplifiers, and means for coupling said "one" reference level to the positive input of the other of said operational amplifiers.

7. Logic detector apparatus according to claim 6, including means for interconnecting the positive input of said one operational amplifier with the negative input of said other operational amplifier.

8. Logic detecting apparatus for receiving a logic input signal and selectively detecting positive and negative voltage levels in said input signal with respect to "one" and "zero" reference levels in positive or negative logic modes, said logic detector apparatus comprising:

a pair of operational amplifiers each having positive and negative inputs;

means for coupling a "zero" reference level to the negative input of one of said operational amplifiers;

means for coupling a "one" reference level to the positive input of the other of said operational amplifiers;

means for coupling said logic input signal to the positive input of said one operational amplifier and to the negative input of said other operational amplifier;

four selection NOR gates each having three inputs and an output;

a first of said selection NOR gates associated with detecting positive and negative voltage levels in said input signal with respect to the "zero" reference levels in a positive logic mode;

a second of said selection NOR gates associated with detecting positive and negative voltage levels in said input signal with respect to said "one" reference level in a positive logic mode;

a third of said slection NOR gates associated with detecting positive and negative voltage levels in said input signal with respect to said "zero" reference level in a negative logic mode;

a fourth of said selection NOR gates associated with detecting positive and negative voltage levels in said input signal with respect to said "one" reference levels in a negative logic mode;

a pair of inverters each coupled respectively between one of said operational amplifiers and the inputs of said first and second selection NOR gates;

means for respectively connecting the outputs of said operational amplifiers to the respective inputs of said third and fourth selection NOR gates in a noninverting manner;

two control inputs (Logic Level and Logic Level Complement) to said apparatus, including means for connecting one of said control inputs to the inputs of said first and third selection NOR gates and for connecting the other of said control inputs to said second and fourth selection NOR gates;

two other control inputs (Negative Logic and Negative Logic Complement) to said apparatus, including means for connecting one of said other control inputs to said first and second of said selective NOR gate and for connecting the other of said control inputs to said third and fourth of said selection NOR gates;

said control inputs including means for selecting one of said selection NOR gates for responding to said logic input signal; and an output NOR gate having four inputs respectively connected to the outputs of said four selection NOR gates;

said output NOR gate providing an output responsive to said input signal being more or less positive than the respective "zero" or "one" reference level.

9. Logic detector apparatus for receiving a logic input signal and selectively detecting positive and negative voltage levels in said input signal with respect to "one" and "zero" reference levels in positive or negative logic modes, said logic detector apparatus comprising:

a final logic gate having four input leads and an output;

four selection logic gates each having an output connected to a respective input of said final logic gate;

two logic mode control inputs to said apparatus for selecting two of said selection logic gates for respective operation in one of said positive or negative logic modes;

two reference level control inputs to said apparatus for selecting two of said selection logic gates for respective operation in detecting positive and negative voltage levels in said input signal with respect to one of said reference levels;

means for coupling said logic mode control inputs and said reference level control inputs to the inputs of each of said selection logic gates for selecting one of said selection logic gates associated with one of said logic modes and one of said reference levels;

comparator means for receiving said logic input signal;

said comparator means including means for comparing said input signal with one of said reference levels and coupling respective outputs to two of said selection logic gates and means for comparing said input signal with the other of said reference levels and coupling respective outputs to the other two of said selection logic gates, and said output logic gate providing an output responsive to said input signal being more or less positive than the respective reference level.

* * * * *